United States Patent
Zimmer et al.

(10) Patent No.: US 10,502,604 B2
(45) Date of Patent: Dec. 10, 2019

(54) APPARATUS FOR DETERMINING A DIFFERENTIAL ZERO OFFSET IN A VIBRATING FLOWMETER AND RELATED METHOD

(71) Applicant: Micro Motion, Inc., Boulder, CO (US)

(72) Inventors: Patrick John Zimmer, Denver, CO (US); Christopher Douglas Hill, Ponte Vedra Beach, FL (US)

(73) Assignee: Micro Motion, Inc., Boulder, CO (US)

( * ) Notice: Subject to any disclaimer, the term of this patent is extended or adjusted under 35 U.S.C. 154(b) by 309 days.

(21) Appl. No.: 15/318,264

(22) PCT Filed: Jul. 14, 2014

(86) PCT No.: PCT/US2014/046521
§ 371 (c)(1),
(2) Date: Dec. 12, 2016

(87) PCT Pub. No.: WO2016/010514
PCT Pub. Date: Jan. 21, 2016

(65) Prior Publication Data
US 2017/0131128 A1    May 11, 2017

(51) Int. Cl.
*G01F 1/12* (2006.01)
*G01F 1/50* (2006.01)
(Continued)

(52) U.S. Cl.
CPC ............ *G01F 1/8436* (2013.01); *G01F 9/001* (2013.01); *G01F 15/024* (2013.01)

(58) Field of Classification Search
CPC ....... G01F 1/8436; G01F 9/001; G01F 15/024
(Continued)

(56) References Cited

U.S. PATENT DOCUMENTS

| 4,109,524 A | * | 8/1978 | Smith | .................... G01F 1/8418 73/861.357 |
| RE31,450 E | * | 11/1983 | Smith | .................... G01F 1/8413 73/32 A |

(Continued)

FOREIGN PATENT DOCUMENTS

| CA | 2955089 A1 | * | 1/2016 | ........... G01F 1/8436 |
| WO | 2008013545 A1 |   | 1/2008 | |

(Continued)

*Primary Examiner* — Michael P Nghiem
(74) *Attorney, Agent, or Firm* — The Ollila Law Group LLC

(57) ABSTRACT

A method for operating a system configured to consume a fluid, such as engine fuel, having at least two flowmeters is provided. The method includes the step of recirculating a fluid in a closed loop having a supply-side flowmeter and return-side flowmeter, such that substantially no fluid is consumed. Fluid flow is measured in the supply-side flowmeter and the return-side flowmeter. Fluid flow measurements are compared between the supply-side flowmeter and return-side flowmeter, and a first differential zero value based on the difference in the fluid flow measurements between the supply-side flowmeter and return-side flowmeter is determined. A first temperature sensor signal value is received and is associated with the first differential zero value. The first differential zero value associated with the first temperature sensor signal value is stored in a meter electronics.

5 Claims, 8 Drawing Sheets

(51) Int. Cl.
  *G01F 25/00* (2006.01)
  *G01F 1/84* (2006.01)
  *G01F 15/02* (2006.01)
  *G01F 9/00* (2006.01)

(58) Field of Classification Search
  USPC .......................................................... 702/100
  See application file for complete search history.

(56) References Cited

U.S. PATENT DOCUMENTS

| | | | | |
|---|---|---|---|---|
| 4,491,025 A | * | 1/1985 | Smith | G01F 1/8477 |
| | | | | 73/861.355 |
| 4,612,804 A | | 9/1986 | Colonnello | |
| 2003/0212509 A1 | * | 11/2003 | Henry | G01F 1/8427 |
| | | | | 702/45 |
| 2009/0272173 A1 | * | 11/2009 | McAnally | G01F 1/8413 |
| | | | | 73/1.16 |
| 2012/0125123 A1 | * | 5/2012 | Hays | G01F 1/8431 |
| | | | | 73/861.357 |
| 2012/0125124 A1 | * | 5/2012 | Hays | G01F 1/8436 |
| | | | | 73/861.357 |

FOREIGN PATENT DOCUMENTS

| | | | |
|---|---|---|---|
| WO | 2010120245 | A1 | 10/2010 |
| WO | 2011019344 | A2 | 2/2011 |

* cited by examiner

APPARATUS FOR DETERMINING A DIFFERENTIAL ZERO OFFSET IN A VIBRATING FLOWMETER AND RELATED METHOD

TECHNICAL FIELD

The present invention relates to flowmeters, and more particularly to a method and apparatus for determining a change in a zero offset of a vibrating flowmeter.

BACKGROUND OF THE INVENTION

Vibrating sensors, such as for example, vibrating densitometers and Coriolis flowmeters are generally known, and are used to measure mass flow and other information for materials flowing through a conduit in the flowmeter. Exemplary Coriolis flowmeters are disclosed in U.S. Pat. Nos. 4,109,524, 4,491,025, and Re. 31,450, all to J. E. Smith et al. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no flow through the flowmeter, a driving force applied to the conduit(s) causes all points along the conduit(s) to oscillate with identical phase or a small "zero offset", which is a time delay measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

Meter electronics connected to the driver generate a drive signal to operate the driver and determine a mass flow rate and other properties of a material from signals received from the pickoffs. The driver may comprise one of many well known arrangements; however, a magnet and an opposing drive coil have received great success in the flowmeter industry. An alternating current is passed to the drive coil for vibrating the conduit(s) at a desired flow tube amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage. The magnitude of the time delay measured by the pickoffs is very small; often measured in nanoseconds. Therefore, it is necessary to have the transducer output be very accurate.

Generally, a Coriolis flowmeter can be initially calibrated and a flow calibration factor along with a zero offset can be generated. In use, the flow calibration factor can be multiplied by the time delay measured by the pickoffs minus the zero offset to generate a mass flow rate. In most situations, the flowmeter is initially calibrated, typically by the manufacturer, and assumed to provide accurate measurements without subsequent calibrations required. In addition, a prior art approach involves a user zero-calibrating the flowmeter after installation by stopping flow, closing valves, and therefore providing the meter a zero flow rate reference at process conditions.

As mentioned above, in many vibrating sensors, including Coriolis flowmeters, a zero offset may be present, which prior art approaches initially correct for. Although this initially determined zero offset can adequately correct the measurements in limited circumstances, the zero offset may change over time due to a change in a variety of operating conditions, mainly temperature, resulting in only partial corrections. However, other operating conditions may also affect the zero offset, including pressure, fluid density, sensor mounting conditions, etc. Furthermore, the zero offset may change at a different rate from one meter to another. This may be of particular interest in situations where more than one meter is connected in series such that each of the meters should read the same if the same fluid flow is being measured.

In marine industry applications, seafaring vessels often employ fuel switching schemes, whereby a marine engine operates on different types of fuel (or a blend thereof). Typically heavy fuel oil (HFO) and either marine diesel oil (MDO) or marine fuel oil (MFO) are the fuels used. When the fuel source is switched, the HFO operating temperature of between about 120-150° C., is changed to an operating temperature of about 30-50° C. for MDO/MFO. As there is about a 50° C. temperature difference between the two operating temperatures, temperature-driven zero-drift issues arise.

Therefore, there is a need in the art for a method to determine and compensate for changes in the zero offset of vibrating sensors that experience changes in operating temperature. The present invention overcomes this and other problems and an advance in the art is achieved.

SUMMARY OF THE INVENTION

A method for operating a system configured to consume a fluid, having at least two flowmeters is provided according to an embodiment. The embodiment comprises the steps of:
  recirculating a fluid in a closed loop having a supply-side flowmeter and return-side flowmeter, such that substantially no fluid is consumed;
  measuring a fluid flow in the supply-side flowmeter and the return-side flowmeter;
  comparing fluid flow measurements between the supply-side flowmeter and return-side flowmeter;
  determining a first differential zero value based on a difference in the fluid flow measurements between the supply-side flowmeter and return-side flowmeter;
  receiving a first temperature sensor signal value;
  associating the first differential zero value with the first temperature sensor signal value; and
  storing the first differential zero value associated with the first temperature sensor signal value in a meter electronics.

A method for operating a multi-fuel system, having an engine, at least two fuel tanks configured to each contain different fuels, and at least a supply-side flowmeter and a return-side flowmeter is provided according to an embodiment. The embodiment comprises the steps of:

recirculating a first fuel type in a closed loop while the engine is not operating, such that substantially no fuel is consumed;

measuring a first fuel flow in the supply-side flowmeter and the return-side flowmeter;

comparing the first fuel flow measurements between the supply-side flowmeter and return-side flowmeter, and determining a first differential zero value based on the difference in the fuel flow measurements between the supply-side flowmeter and return-side flowmeter;

receiving a first temperature sensor signal value;

associating the first differential zero value with the first temperature sensor signal value and the first fuel type;

storing the first differential zero value associated with the first temperature sensor signal value and the first fuel type in a meter electronics;

recirculating a second fuel type in a closed loop while the engine is not operating, such that substantially no fuel is consumed;

measuring a second fuel flow in the supply-side flowmeter and the return-side flowmeter;

comparing the second fuel flow measurements between the supply-side flowmeter and return-side flowmeter, and determining a second differential zero value based on the difference in the fuel flow measurements between the supply-side flowmeter and return-side flowmeter;

receiving a second temperature sensor signal value;

associating the second differential zero value with the second temperature sensor signal value and second fuel type;

storing the second differential zero value associated with the second temperature sensor signal value and the second fuel type in the meter electronics.

A meter electronics for flowmeters, including a processing system, connected to a system having an engine is provided according to an embodiment. According to the embodiment, the meter electronics is configured to:

receive sensor signals from both a supply-side flowmeter and return-side flowmeter while the engine is not operating;

determine a differential zero offset between the supply-side flowmeter and the return-side flowmeter based on the received sensor signals;

determine the temperature of at least one of the supply-side flowmeter or the return-side flowmeter;

associate the differential zero offset with the temperature; and store the differential zero offset associated with the temperature in meter electronics.

Aspects

According to an aspect, a method for operating a system configured to consume a fluid, having at least two flowmeters is provided. The aspect comprises the steps of: recirculating a fluid in a closed loop having a supply-side flowmeter and return-side flowmeter such that substantially no fluid is consumed; measuring a fluid flow in the supply-side flowmeter and the return-side flowmeter; comparing fluid flow measurements between the supply-side flowmeter and return-side flowmeter; determining a first differential zero value based on a difference in the fluid flow measurements between the supply-side flowmeter and return-side flowmeter; receiving a first temperature sensor signal value; associating the first differential zero value with the first temperature sensor signal value; and storing the first differential zero value associated with the first temperature sensor signal value in a meter electronics.

Preferably, multiple differential zero values are determined for the first temperature sensor signal value, each at different time points, and are stored and associated with the first temperature sensor signal value.

Preferably, the aspect comprises the steps of averaging the multiple differential zero values to calculate an averaged multiple differential zero value; associating the averaged multiple differential zero value with the first temperature sensor signal value; and storing the averaged multiple differential zero value associated with the first temperature sensor signal value in the meter electronics.

Preferably, the aspect comprises the steps of applying a statistical analysis to the multiple differential zero values, and discarding outlier differential zero values.

Preferably, the aspect comprises the steps of: operating an engine disposed between the supply-side flowmeter and the return-side flowmeter, such that fluid is consumed; receiving a temperature sensor signal value from at least one of the supply-side flowmeter and the return-side flowmeter while the engine is operating; measuring a fluid flow in the supply-side flowmeter and the return-side flowmeter while the engine is operating; calculating engine fluid consumption by comparing fluid flow measurements between the supply-side flowmeter and return-side flowmeter with an engine fluid consumption equation; applying a differential zero value associated with a temperature sensor signal value in the meter electronics to the engine fluid consumption equation; and outputting an adjusted fluid consumption measurement that is corrected for the operating temperature.

Preferably, the aspect comprises the steps of: measuring a second fluid flow in the supply-side flowmeter and the return-side flowmeter; comparing the second fluid flow measurements between the supply-side flowmeter and return-side flowmeter, and determining a second differential zero value based on the difference in the fluid flow measurements between the supply-side flowmeter and return-side flowmeter; receiving a second temperature sensor signal value from at least one of the supply-side flowmeter and the return-side flowmeter; associating the second differential zero value with the second temperature sensor signal; and storing the second differential zero value associated with the second temperature sensor signal value in the meter electronics.

Preferably, the aspect comprises the steps of: operating an engine disposed between the supply-side flowmeter and the return-side flowmeter such that fluid is consumed; receiving a temperature sensor signal value from at least one of the supply-side flowmeter and the return-side flowmeter while the engine is operating; measuring a fluid flow in the supply-side flowmeter and the return-side flowmeter while the engine is operating; calculating engine fluid consumption by comparing fluid flow measurements between the supply-side flowmeter and return-side flowmeter with an engine fluid consumption equation; applying a differential zero value associated with the first temperature sensor signal value in the meter electronics to the engine fluid consumption equation if the temperature sensor signal value received from at least one of the supply-side flowmeter and the return-side flowmeter while the engine is operating is within a threshold related to the first temperature sensor signal value in the meter electronics; applying a differential zero value associated with the second temperature sensor signal value in the meter electronics to the engine fluid consumption equation if the temperature sensor signal value received from at least one of the supply-side flowmeter and the return-side flowmeter while the engine is operating is within a threshold related to the second temperature sensor signal value in the meter electronics; and outputting an adjusted fluid consumption measurement that is corrected for the operating temperature.

Preferably, the aspect comprises the step of applying an interpolated differential zero value derived from the first temperature sensor signal value in the meter electronics and second temperature sensor signal value to the engine fluid consumption equation if the temperature sensor signal value received from at least one of the supply-side flowmeter and the return-side flowmeter while the engine is operating is between the first temperature sensor signal value in the meter electronics and the second temperature sensor signal value in the meter electronics.

Preferably, the aspect comprises the step of applying an extrapolated differential zero value derived from the first temperature sensor signal value in the meter electronics and second temperature sensor signal value to the engine fluid consumption equation if the temperature sensor signal value received from at least one of the supply-side flowmeter and the return-side flowmeter while the engine is operating is outside the range of the first temperature sensor signal value in the meter electronics and the second temperature sensor signal value in the meter electronics.

According to an aspect, a method for operating a multi-fuel system, having an engine, at least two fuel tanks configured to each contain different fuels, and at least a supply-side flowmeter and a return-side flowmeter is provided. The method comprises the steps of: recirculating a first fuel type in a closed loop while the engine is not operating, such that substantially no fuel is consumed; measuring a first fuel flow in the supply-side flowmeter and the return-side flowmeter; comparing the first fuel flow measurements between the supply-side flowmeter and return-side flowmeter, and determining a first differential zero value based on the difference in the fuel flow measurements between the supply-side flowmeter and return-side flowmeter; receiving a first temperature sensor signal value; associating the first differential zero value with the first temperature sensor signal value and the first fuel type; storing the first differential zero value associated with the first temperature sensor signal value and the first fuel type in a meter electronics; recirculating a second fuel type in a closed loop while the engine is not operating, such that substantially no fuel is consumed; measuring a second fuel flow in the supply-side flowmeter and the return-side flowmeter; comparing the second fuel flow measurements between the supply-side flowmeter and return-side flowmeter, and determining a second differential zero value based on the difference in the fuel flow measurements between the supply-side flowmeter and return-side flowmeter; receiving a second temperature sensor signal value; associating the second differential zero value with the second temperature sensor signal value and second fuel type; and storing the second differential zero value associated with the second temperature sensor signal value and the second fuel type in the meter electronics.

Preferably, the aspect comprises the steps of operating the engine using the first fuel type; measuring a first operating temperature of at least one of the supply-side flowmeter and the return-side flowmeter; retrieving a first differential zero value that corresponds to the first operating temperature and the first fuel type; applying the first differential zero value to an engine fluid consumption equation; and outputting an adjusted fluid consumption measurement calculated with the engine fluid consumption equation that is corrected for the first operating temperature and first fuel type.

Preferably, the aspect comprises the steps of switching the fuel type for engine operation; measuring a second operating temperature of at least one of the supply-side flowmeter and the return-side flowmeter; retrieving a second differential zero value that corresponds to the second operating temperature and the second fuel type; applying the second differential zero value to the engine fluid consumption equation; and outputting an adjusted fluid consumption measurement calculated with the engine fluid consumption equation that is corrected for the second operating temperature and second fuel type.

According to an aspect, a meter electronics for flowmeters, including a processing system, connected to a system having an engine is provided. The meter electronics is configured to: receive sensor signals from both a supply-side flowmeter and return-side flowmeter while the engine is not operating; determine a differential zero offset between the supply-side flowmeter and the return-side flowmeter based on the received sensor signals; determine the temperature of at least one of the supply-side flowmeter or the return-side flowmeter; associate the differential zero offset with the temperature; and store the differential zero offset associated with the temperature in meter electronics.

Preferably, the processing system is configured to: determine a first operating temperature of at least one of the supply-side flowmeter or the return-side flowmeter; compare the first operating temperature to one or more previous temperatures stored in the meter electronics; and if the previously determined zero offset is associated with the first operating temperature, then apply the zero offset associated with the first operating temperature to a calculation for determining engine fuel consumption.

Preferably, the processing system is configured to: determine a second operating temperature of at least one of the supply-side flowmeter or the return-side flowmeter; compare the second operating temperature to one or more previous temperatures stored in the meter electronics; and if the previously determined zero offset is associated with the second operating temperature, then apply the zero offset associated with the second operating temperature to a calculation for determining engine fuel consumption.

Preferably, the processing system is configured to: store multiple differential zero offsets associated with multiple respective temperatures of at least one of the supply-side flowmeter or the return-side flowmeter; calculate an interpolated zero offset if a measured operating temperature is between at least two of the multiple respective temperatures; and apply the interpolated zero offset associated with the measured operating temperature to a calculation for determining engine fuel consumption.

Preferably, the processing system is configured to: store multiple differential zero offsets associated with multiple respective temperatures of at least one of the supply-side flowmeter or the return-side flowmeter; calculate an extrapolated zero offset if a measured operating temperature is beyond the range of the multiple respective temperatures; and apply the extrapolated zero offset associated with the measured operating temperature to a calculation for determining engine fuel consumption.

Preferably, the processing system is configured to switch between multiple stored zero offset values associated with respective stored temperatures to correspond with an operating temperature.

According to an aspect, a method for operating a flowmeter is provided. The method comprises the steps of: associating a first zero offset value with a first temperature sensor signal value; storing the first zero offset value associated with the first temperature sensor signal value in a meter electronics; associating a second zero offset value with a second temperature sensor signal value; and storing the second zero offset value associated with the second temperature sensor signal value in the meter electronics.

Preferably, the method for operating a flowmeter comprises the steps of: measuring an operating temperature of the flowmeter; comparing the operating temperature to at least the first zero offset value and the second zero offset value; retrieving a stored zero offset value that most closely corresponds to the operating temperature; applying the stored zero offset value that most closely corresponds to the operating temperature to an operating routine; and outputting an adjusted flowmeter measurement that is corrected for the operating temperature.

DETAILED DESCRIPTION OF THE INVENTION

FIGS. 1-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
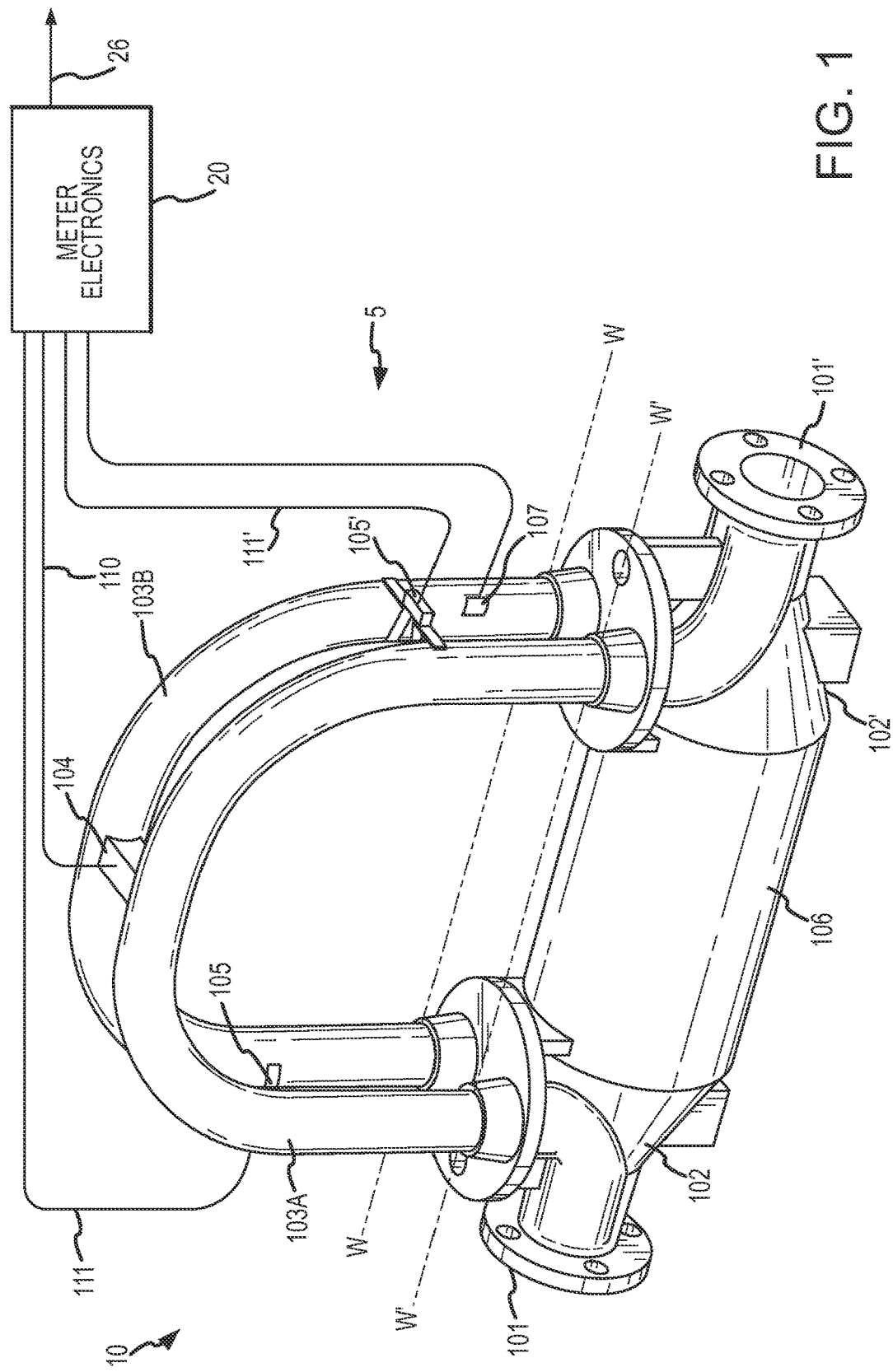
FIG. 1 shows a vibrating sensor assembly according to an embodiment of the invention.

FIG. 1 illustrates an example of a flowmeter 5 in the form of a Coriolis flowmeter comprising a sensor assembly 10 and one or more meter electronics 20. The one or more meter electronics 20 are connected to sensor assembly 10 to measure a characteristic of a flowing material, such as, for example, density, mass flow rate, volume flow rate, totalized mass flow, temperature, and other information.

The sensor assembly 10 includes a pair of flanges 101 and 101', manifolds 102 and 102', and conduits 103A and 103B. Manifolds 102, 102' are affixed to opposing ends of the conduits 103A, 103B. Flanges 101 and 101' of the present example are affixed to manifolds 102 and 102'. Manifolds 102 and 102' of the present example are affixed to opposite ends of spacer 106. The spacer 106 maintains the spacing between manifolds 102 and 102' in the present example to prevent undesired vibrations in conduits 103A and 103B. The conduits 103A and 103B extend outwardly from the manifolds in an essentially parallel fashion. When the sensor assembly 10 is inserted into a pipeline system (not shown) which carries the flowing material, the material enters sensor assembly 10 through flange 101, passes through inlet manifold 102 where the total amount of material is directed to enter conduits 103A and 103B, flows through conduits 103A and 103B and back into outlet manifold 102' where it exits the sensor assembly 10 through the flange 101'.

The sensor assembly 10 includes a driver 104. The driver 104 is affixed to conduits 103A and 103B in a position where the driver 104 can vibrate the conduits 103A, 103B in the drive mode. More particularly, the driver 104 includes a first driver component (not shown) affixed to conduit 103A and a second driver component (not shown) affixed to conduit 103B. The driver 104 may comprise one of many well known arrangements, such as a magnet mounted to the conduit 103A and an opposing coil mounted to the conduit 103B.

In the present example, the drive mode is the first out of phase bending mode and the conduits 103A and 103B are preferably selected and appropriately mounted to inlet manifold 102 and outlet manifold 102' so as to provide a balanced system having substantially the same mass distribution, moments of inertia, and elastic moduli about bending axes W-W and W'-W', respectively. In the present example, where the drive mode is the first out of phase bending mode, the conduits 103A and 103B are driven by the driver 104 in opposite directions about their respective bending axes W-W and W'-W'. A drive signal in the form of an alternating current can be provided by one or more meter electronics 20, such as for example via pathway 110, and passed through the coil to cause both conduits 103A, 103B to oscillate. Those of ordinary skill in the art will appreciate that other drive modes may be used within the scope of the present invention.

The sensor assembly 10 shown includes a pair of pickoffs 105, 105' that are affixed to conduits 103A, 103B. More particularly, a first pickoff component (not shown) is located on conduit 103A and a second pickoff component (not shown) is located on conduit 103B. In the embodiment depicted, the pickoffs 105, 105' may be electromagnetic detectors, for example—pickoff magnets and pickoff coils that produce pickoff signals that represent the velocity and position of the conduits 103A, 103B. For example, the pickoffs 105, 105' may supply pickoff signals to the one or more meter electronics via pathways 111, 111'. Those of ordinary skill in the art will appreciate that the motion of the conduits 103A, 103B is proportional to certain characteristics of the flowing material, for example, the mass flow rate and density of the material flowing through the conduits 103A, 103B.

It should be appreciated that while the sensor assembly 10 described above comprises a dual flow conduit flowmeter, it is well within the scope of the present invention to implement a single conduit flowmeter. Furthermore, while the flow conduits 103A, 103B are shown as comprising a curved flow conduit configuration, the present invention may be implemented with a flowmeter comprising a straight flow conduit configuration. Therefore, the particular embodiment of the sensor assembly 10 described above is merely one example and should in no way limit the scope of the present invention.

In the example shown in FIG. 1, the one or more meter electronics 20 receive the pickoff signals from the pickoffs 105, 105'. Path 26 provides an input and an output means that allows one or more meter electronics 20 to interface with an operator. The one or more meter electronics 20 measure a characteristic of a flowing material, such as, for example, a phase difference, a frequency, a time delay, a density, a mass flow rate, a volume flow rate, a totalized mass flow, a meter verification, and other information. More particularly, the one or more meter electronics 20 receive one or more signals, for example, from pickoffs 105, 105' and one or more temperature sensors 107, such as a resistive temperature device (RTD), and use this information to measure a characteristic of a flowing material.

The techniques by which vibrating sensor assemblies, such as for example, Coriolis flowmeters or densitometers, measure a characteristic of a flowing material are well understood; therefore, a detailed discussion is omitted for brevity of this description.

As discussed briefly above, one problem associated with sensor assemblies, such as Coriolis flowmeters, is the presence of a zero offset, which is the measured time delay of the pickoffs 105, 105' at zero fluid flow. If the zero offset is not taken into account when calculating the flow rate and various other flow measurements, the flow measurements will typically include an error. The typical prior art approach to compensate for the zero offset is to measure an initial zero offset ($\Delta t_0$) during an initial calibration process, which usually involves closing valves and providing a zero flow reference condition. Such calibration processes are generally known in the art and a detailed discussion is omitted for brevity of the description. Once an initial zero offset is determined, during operation, flow measurements are corrected by subtracting the initial zero offset from the measured time difference according to equation (1).

$$\dot{m} = FCF(\Delta t_{measured} - \Delta t_0) \quad (1)$$

Where:
$\dot{m}$=mass flow rate
FCF=Flow calibration factor
$\Delta t_{measured}$=measured time delay
$\Delta t_0$=initial zero offset It should be appreciated that equation (1) is merely provided as an example and should in no way limit the scope of the present invention. Although equation (1) is provided to calculate mass flow rate, it should also be appreciated that various other flow measurements may be affected by the zero offset and therefore, may also be corrected.

While this approach can provide satisfactory results in situations where the operating conditions are substantially the same as those present during the initial calibration and determination of the zero offset, $\Delta t_0$, in many circumstances, the operating conditions during use are substantially different from the operating conditions present during calibration. As a result of the change in conditions, the vibrating flowmeter can experience a drift in the zero offset. These issues are particularly pronounced in marine applications that utilize fuels that require substantially different operating temperatures, such as MDO and HFO. In other words, the zero offset can change from the initially calculated zero offset, $\Delta t_0$. The drift in the zero offset can seriously affect the sensor's performance resulting in inaccurate measurements. This is because in the prior art, the zero offset used to compensate for the measured time difference during operation simply comprised the initially calculated zero offset without accounting for a change in the zero offset. Other prior art approaches required manually recalibrating the sensor. Typically, recalibration requires stopping flow through the sensor to re-zero the sensor, which for marine fuel system applications is generally impractical. Also, when flow is stopped to perform a prior art zero calibration, the temperature of the meter can change rapidly if the ambient temperature is different than the fluid temperature. This can cause an unreliable zero calibration.

Figure 2:
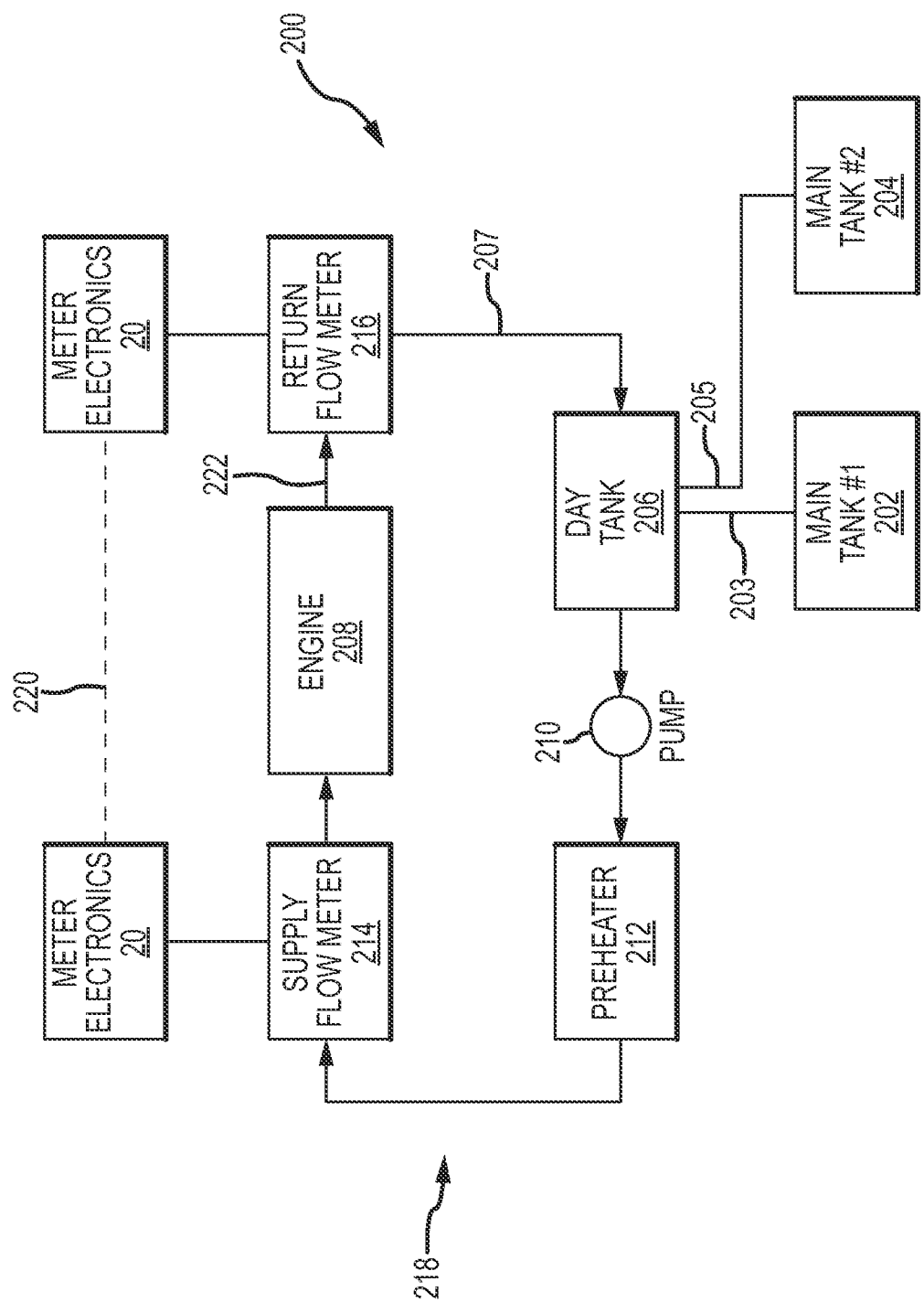
FIG. 2 shows a fuel system according to an embodiment of the invention.

FIG. 2 illustrates a fuel system 200 according to an embodiment. Although the system 200 is shown as a typical marine fuel system, it should be appreciated that fuel is merely one example and the system 200 is equally applicable to other fluids. Therefore, the use of fuel should not limit the scope of the present invention. Fuel is stored in main tanks 202, 204. In one example of an embodiment, HFO is stored in a first main tank 202, and MDO is stored in a second main tank 204. The main tanks 202, 204 are fed into a day tank 206 through fuel lines 203 and 205, respectively. The day tank 206 is typically sized to store a limited amount of fuel for safety and contamination purposes. The day tank 206 prevents too much fuel from being stored in an area, such as a ship's engine room, to minimize fire or explosion risk. Should there be a fire, the limited fuel availability contributes to lower the severity of fire-related incidents. Additionally, the day tank 206 receives fuel that has been presented to an engine 208, but not utilized thereby, thus return fuel is routed back to the day tank through another fuel line 207. It should be appreciated that while the system 200 only shows one fuel outlet 222 and two flowmeters 214, 216, in some embodiments there will be multiple fuel outlets and more than two flowmeters.

During operation, fuel is typically recirculated from the day tank 206 to the engine 208 or other fuel consuming device and whatever fuel is not consumed flows back to the day tank 206 in a closed loop. Should the day tank 206 become low on fuel, fuel from a main tank 202, 204 replenishes the day tank 206. A pump 210 provides the action necessary to pump the fuel from the day tank 206 to the engine 208 and back. An inline preheater 212 heats the fuel to a temperature that is ideal for the fuel being utilized by the engine 208. For example, the operating temperature of HFO is generally between about 120-150° C., while MDO/MFO is ideally around 30-50° C. The appropriate temperature for a particular fuel allows the viscosity of the fuel to be controlled and kept in an ideal range. The kinematic viscosity of the fuel is a measure of the fluidity at a certain temperature. Since the viscosity of a fuel decreases with increasing temperature, the viscosity at the moment the fuel leaves the engine's fuel injectors (not shown) must be within a range dictated by the engine manufacturer in order to create an optimal fuel spray pattern. Viscosities that deviate from specifications lead to substandard combustion, power loss, and potentially deposit formation. The preheater 212, when set correctly for the particular fuel being used, allows for an optimal viscosity to be obtained.

In order to measure flow parameters, such as mass flow rate, for example, inline flowmeters are used. A supply-side flowmeter 214 is situated upstream of the engine 208, while a return-side flowmeter 216 is situated downstream of the engine 208. Since the engine 208 does not use all of the fuel provided to the engine in a common fuel rail system (not shown), excess fuel is recirculated through the day tank 206 and the closed loop circuit 218. Therefore, a single flowmeter would not provide accurate flow measurements, especially as related to engine fuel consumption, thus necessitating both supply-side 214 and return-side 216 flowmeters (upstream and downstream of the engine 208, respectively). According to an embodiment, the difference in flow rates measured by the flowmeters 214, 216 is substantially equal to the flow rate of the fuel being consumed by the engine 208. Therefore, the difference in the measured flow rates between the flowmeters 214, 216 is the value of interest in most applications similar to the configuration shown in FIG. 2. It should be noted, however, that a common rail fuel system serves only as an example, and does not limit the scope of the claimed invention. Other fuel systems wherein fuel is returned and/or recirculated are contemplated.

Since multiple flowmeters 214, 216 are employed, it is vital for accuracy that each meter accurately sets a zero offset, as noted in the description above and in equation (1). Even more important is that both meters 214, 216 are adjusted to have a zero point that is set in relation to each other, and this is referred to as the differential zero. For example, under non-consumption conditions (i.e. the engine 208 is off and fuel is pumped through both flowmeters 214, 216 in the closed loop circuit 218), the flowmeters should theoretically indicate a zero-consumption condition. The differential zero offset comprises an initial zero offset of a flowmeter combined with a differential error between two or more flowmeters. The differential zero offset may be required in order to generate substantially equal flow rates through the flowmeter of interest and a reference flowmeter. In other words, referring to equation (1) above, if the same fluid flow rate flows through a flowmeter being calibrated and a reference flowmeter, the two flowmeters can generate two mass flow rates using equation (1) for each flowmeter. If we assume the reference flowmeter's mass flow rate is equal to the mass flow rate of the meter being calibrated, then the differential zero offset of the flowmeter being calibrated can be calculated. This method finds a new zero offset for the flowmeter being calibrated to reflect the reference flow rate. This new zero offset is essentially a differential offset. This is shown in equations (2)-(4).

$$\dot{m}_R = \dot{m}_C = FCF_C[\Delta t_c - (\Delta t_{0c} + \Delta t_E)] \quad (2)$$

$$(\Delta t_{0C} + \Delta t_E) = \Delta t_c - \frac{\dot{m}_R}{FCF_C} \quad (3)$$

Where:
$\dot{m}_R$=reference mass flow rate
$\dot{m}_C$=mass flow rate of the flowmeter being calibrated
$\Delta t_{0C}$=initial zero offset of the flowmeter being calibrated
$\Delta t_E$=differential error
$\Delta t_c$=measured time delay of the flowmeter being calibrated
$FCF_C$=flow calibration factor of the flowmeter being calibrated Equation (3) can be further reduced by combining the zero offset of the flowmeter being calibrated and the differential error. The result is an equation that defines the differential zero offset, which is shown in equation (4).

$$(\Delta t_D) = \Delta t_c - \frac{\dot{m}_R}{FCF_C} \quad (4)$$

Where:
$\Delta t_D$=differential zero offset

Therefore, the flowmeter offset of particular interest is not an absolute zero offset in the sense that it is referenced to zero flow rate, but rather, the zero offset comprises a differential zero offset in that it accounts for a difference between the two flowmeters 214, 216. When this differential offset is characterized and eliminated, the differential measurement performance of the flowmeter pair is greatly improved. It should be appreciated that equation (4) could be further reduced in any number of ways by assuming certain values remain constant, such as the flow calibration factors or the initial zero offset values. Therefore, the particular form of equation (4) should not limit the scope of the present invention.

There is a desire in the system 200 configuration to size flowmeters such that there is very little pressure drop, which means relatively low flow rates for the flowmeters' size. With such low flow rates, the time delay between the pickoffs will also be relatively small. With the measured time delay so close to the zero offset, the zero offset of the flowmeter can seriously affect the meter's accuracy. It can easily be appreciated that because of the increased sensitivity to the zero offset in the system 200, that even a small drift in the zero offset can adversely affect the entire system.

Because the difference in the measurements is the value of interest, the absolute zero offset of the individual flowmeters 214, 216 is not needed to correct the measurement. By way of example, the return-side flowmeter 216 can be referenced against the supply-side flowmeter 214. Therefore, in embodiments where the zero offset comprises a differential zero offset, one of the flowmeters may be considered a reference flowmeter with the zero offset of the other flowmeter calibrated to match the reference meter. Therefore, the differential zero offset can be calculated using at least equation (3).

Given the wide range of operating temperatures in dual-fuel systems, in order to achieve a greater level of accuracy, in an embodiment of a system 200 it is necessary to characterize the differential offset over the range in operating temperatures.

Figure 3:
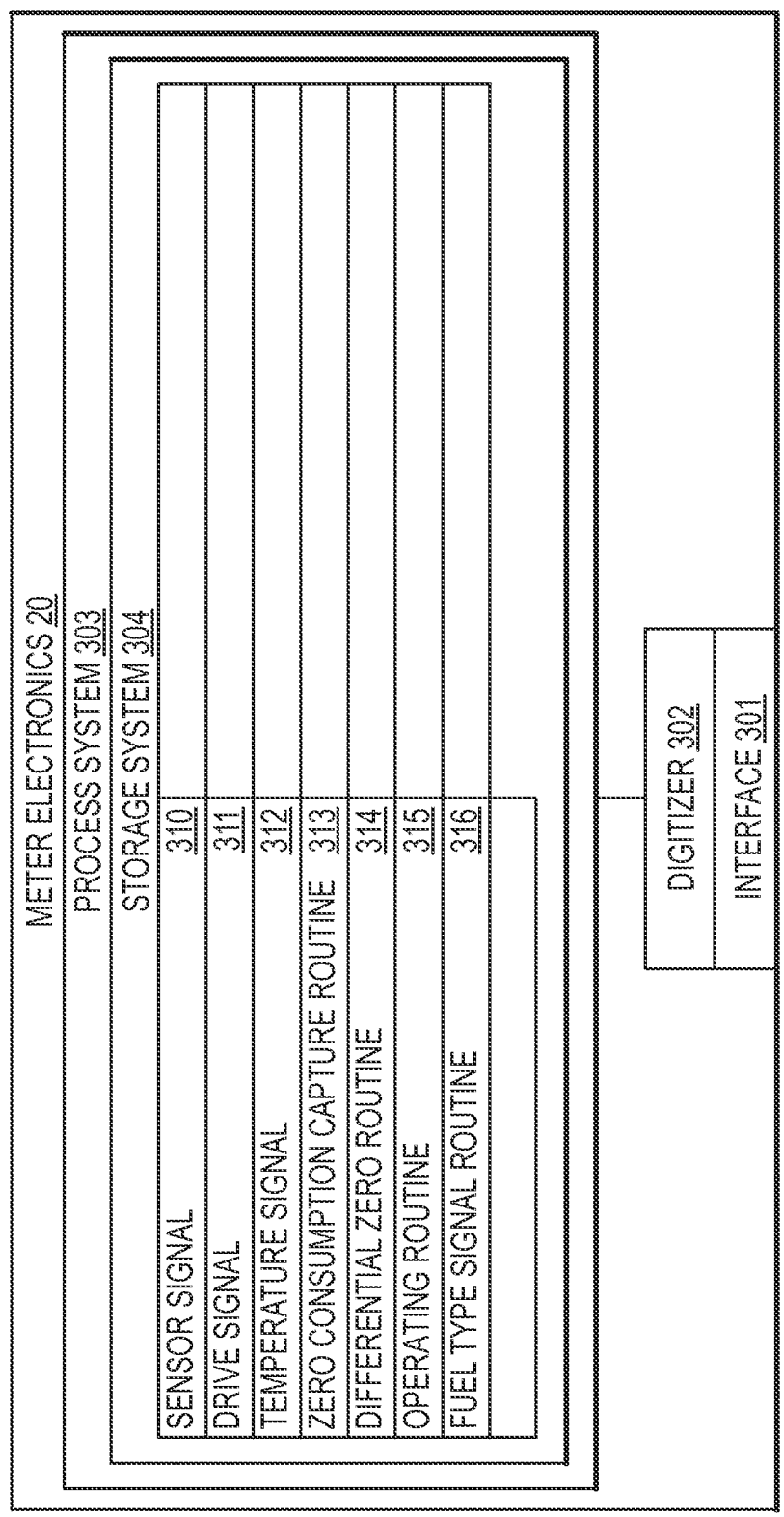
FIG. 3 shows meter electronics according to an embodiment of the invention.

FIG. 3 shows the meter electronics 20 according to an embodiment of the invention. The meter electronics 20 can include an interface 301 and a processing system 303. The processing system 303 may include a storage system 304. The storage system 304 may comprise an internal memory, or alternatively, may comprise an external memory. The meter electronics 20 can generate a drive signal 311 and supply the drive signal 311 to the driver 104. In addition, the meter electronics 20 can receive sensor signals 310 from the flowmeters 214, 216, such as pickoff/velocity sensor signals, strain signals, optical signals, or any other signals known in the art. In some embodiments, the sensor signals 310 can be received from the driver 104. The meter electronics 20 can operate as a densitometer or can operate as a mass flowmeter, including operating as a Coriolis flowmeter. It should be appreciated that the meter electronics 20 may also operate as some other type of vibrating sensor assembly and the particular examples provided should not limit the scope of the present invention. The meter electronics 20 can process the sensor signals 310 in order to obtain flow characteristics of the material flowing through the flow conduits 103A, 103B. In some embodiments, the meter electronics 20 may receive a temperature signal 312 from one or more RTD sensors or other temperature sensors 107, for example.

The interface 301 can receive the sensor signals 310 from the driver 104 or pickoffs 105, 105', via leads 110, 111, 111'. The interface 301 may perform any necessary or desired signal conditioning, such as any manner of formatting, amplification, buffering, etc. Alternatively, some or all of the signal conditioning can be performed in the processing system 303. In addition, the interface 301 can enable communications between the meter electronics 20 and external devices. The interface 301 can be capable of any manner of electronic, optical, or wireless communication.

The interface 301 in one embodiment can include a digitizer 302, wherein the sensor signal comprises an analog sensor signal. The digitizer 302 can sample and digitize the analog sensor signal and produce a digital sensor signal. The digitizer 302 can also perform any needed decimation, wherein the digital sensor signal is decimated in order to reduce the amount of signal processing needed and to reduce the processing time.

The processing system 303 can conduct operations of the meter electronics 20 and process flow measurements from the sensor assembly 10. The processing system 303 can execute one or more processing routines, such as the zero consumption capture routine 313, the differential zero routine 314, a general operating routine 315, and fuel type signal routine 316, and thereby process the flow measurements in order to produce one or more flow measurements that compensate for a drift in the zero offset of the flowmeter.

According to an embodiment, the meter electronics 20 can be configured to measure flow through the supply-side flowmeter 214 and return-side flowmeter 216 as part of a zero consumption capture routine 313. This occurs when the engine 208 is not operating, but fuel is passing through the closed loop circuit 218. According to an embodiment, the meter electronics 20 can also measure and store a temperature signal 312, and associate that temperature with the flow rates captured at that temperature.

As an example of a zero consumption capture routine 313, the system 200 may include a supply-side flowmeter 214 and a return-side flowmeter 216, that each have (or share) meter electronics 20. The meter electronics, if not shared, may communicate with each other via an interconnect 220. The return-side flowmeter 216 may generate consumption outputs, such as differential mass flow rate or differential mass flow total, for example, as part of the operating routine 315. In one embodiment of the operating routine 315, the return flow rate is subtracted from the supply flow rate, thereby offering a consumption measurement. Meter electronics 20 subtract the two absolute flow signals producing a differential output, and account for any signal processing delays between the meters.

The zero consumption capture routine 313 senses when the engine 208 is off and fuel is travelling in the closed loop circuit 218. In this case, the temperature signal 312 is saved and the difference in zero consumption flow rates is also saved and calculated as part of the differential zero routine 314. The differential zero improves the differential flow calculation that is performed between the two meters as it will mitigate temperature effects between the meters. This eliminates the need to do any zeroing procedures prior to operation. In a working example, if the engine is off, there is still flow through both flowmeters 214, 216—1000 kg/hr for example purposes. The meters will likely not each read exactly 1000 kg/hr. Instead, one might read 999 kg/hr and the other 1001 kg/hr, so a user would see a 2 kg/hr consumption (or production) measurement when the engine is off. This error of 2 kg/hr would, over long periods of operation, equate to large discrepancies. Therefore, at a particular temperature, a 2 kg/hr differential zero would be saved in the meter electronics and utilized in the general operating routing 315 as a correction to any flowmeter measurements.

The processing system 303 can comprise a general purpose computer, a micro-processing system, a logic circuit, or some other general purpose or customized processing device. The processing system 303 can be distributed among multiple processing devices. The processing system 303 can include any manner of integral or independent electronic storage medium, such as the storage system 304.

The processing system 303 processes the sensor signal 310 in order to generate the drive signal 311, among other things. The drive signal 311 is supplied to the driver 104 in order to vibrate the associated flow tube(s), such as the flow tubes 103A, 103B of FIG. 1.

It should be understood that the meter electronics 20 may include various other components and functions that are generally known in the art. These additional features are omitted from the description and the figures for the purpose of brevity. Therefore, the present invention should not be limited to the specific embodiments shown and discussed.

As the processing system 303 generates the various flow characteristics, such as for example, the mass flow rate or volume flow rate, an error may be associated with the generated flow rate due to the zero offset of the vibrating flowmeter, and more particularly, a change or a drift in zero offset of the vibrating flowmeter. Although the zero offset is typically initially calculated as described above, the zero offset can drift away from this initially calculated value due to a number of factors including a change in one or more operating conditions—especially the temperature of the vibrating flowmeter. The change in temperature may be due to a change in the fluid temperature, the ambient temperature, or both. In the system 200, the preheater 212 is predominantly responsible for the temperature of the fluid that the flowmeters 214, 216 experience. The change in temperature will likely deviate from a reference or calibration temperature $T_0$ of the sensor during the determination of the initial zero offset. According to an embodiment, the meter electronics 20 can implement a differential zero routine 314 as described further below.

Figure 4:
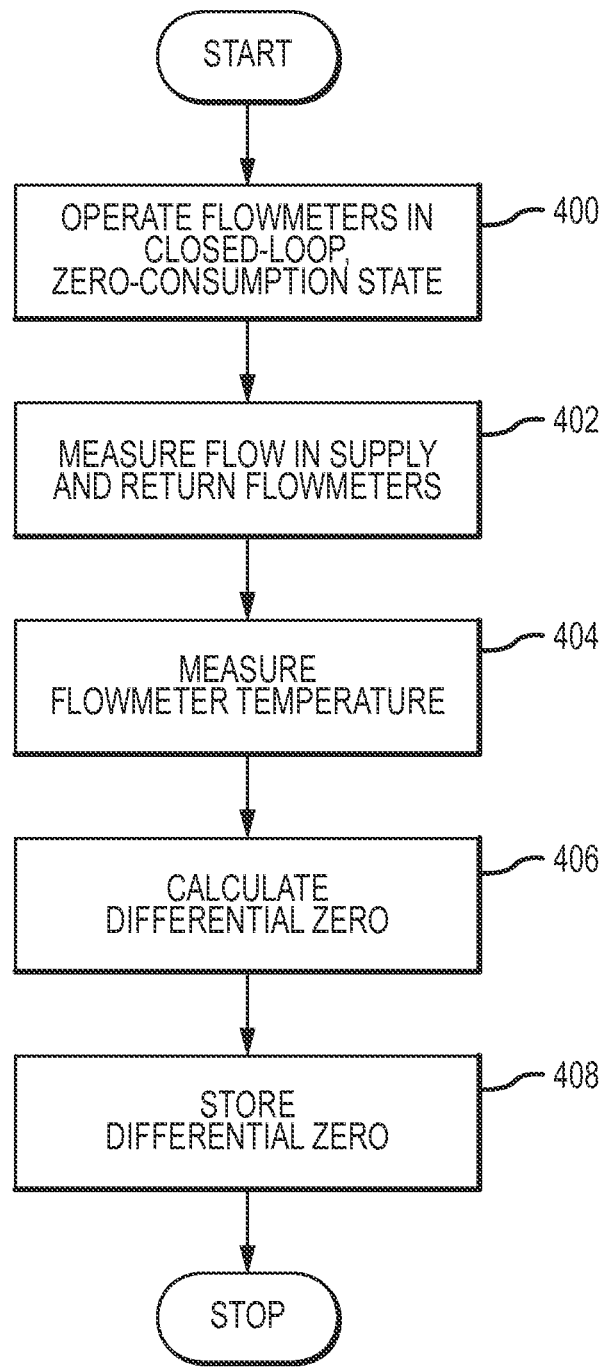
FIG. 4 is a flow chart describing a differential zero routine according to an embodiment of the invention.

FIG. 4. is a flow chart illustrating an embodiment of a routine performed, such as a zero consumption capture routine 313 and/or differential zero routine 314. The system 200 is, at some point, run in a closed-loop zero-consumption state 400. In such a state, the supply-side flowmeter 214 and return-side flowmeter 216 each experience fluid flow, but the engine 208 or other fuel consumption device is not operating. Therefore, no fuel is being consumed, and the measured flow between the flowmeters 214, 216 should be the same. Flow through the flowmeters 214, 216 is then measured in step 402, and the temperature of at least one of the flowmeters 214, 216 is also measured in step 404. In step 402, the received sensor signals may be processed to determine a first flow rate as determined by the supply-side flowmeter 214 and a second flow rate as determined by the return-side flowmeter 216. The first and second flow rates can be determined using equation (1), for example. The sensor signals received may be received during normal operation, for example, while fluid is flowing through the flowmeters 214, 216. The sensor signals may comprise a time delay, a phase difference, a frequency, a temperature, etc. The sensor signals may be processed to determine one or more operating conditions. The one or more current operating conditions may comprise a temperature, a fluid density, a pressure, a drive gain, etc.

The temperature may be determined by processing the sensor signals received in step 404. Alternatively, the one or more operating conditions may be determined from external inputs such as an external temperature sensor (not shown). The temperature may be determined using an RTD, for example. The temperature may correspond to a flowmeter temperature or a meter electronics temperature, for example. According to an embodiment of the invention, the temperature is assumed to be substantially the same between the flowmeters 214, 216. According to another embodiment of the invention, it is assumed that the difference in temperature between the flowmeters 214, 216 remains substantially constant. In one embodiment, each flowmeter 214, 216 comprises separate temperature sensors. In one embodiment, separate temperatures are determined for each flowmeter 214, 216, and the temperatures are averaged for calculation purposes. In one embodiment, separate temperatures are determined for each flowmeter 214, 216, and each temperature measured is input into meter electronics 20. In one embodiment, separate temperatures are determined for each flowmeter 214, 216, and a single temperature is used for calculation purposes.

One or more sensor signals can be received from the flowmeters 214, 216. The sensor signals may be received by pickoffs 105, 105' of the supply-side flowmeter 214, for example. Because there are multiple flowmeters, such as in FIG. 2, the pickoff signals may be received from both flowmeters 214, 216 when there is fluid flowing therethrough. Using the same or similar equations as described above, a differential zero value is calculated in step 406, and this is stored in meter electronics 20 in step 408. The differential zero values and corresponding temperatures may be stored in a variety of formats including, for example, look-up tables, graphs, equations, etc., and may be stored in meter electronics 20, local hardware, software, or remote hardware/computing devices (not shown).

According to an embodiment of the invention, the differential zero offset can be determined using equations (2)-(4), for example. According to an embodiment of the invention, the determined zero offset may comprise the initially determined zero offset. This may be the case if a routine of FIGS. 4-6, for example, is implemented as part of the initial calibration of the vibrating flowmeter. According to another embodiment of the invention, the determined zero offset may comprise a subsequently determined zero offset. The subsequently determined differential zero offset may be different than the initially determined zero offset. This may be the case especially in situations where the operating conditions are different from the operating conditions when the initial zero offset was determined, for example.

Figure 5:
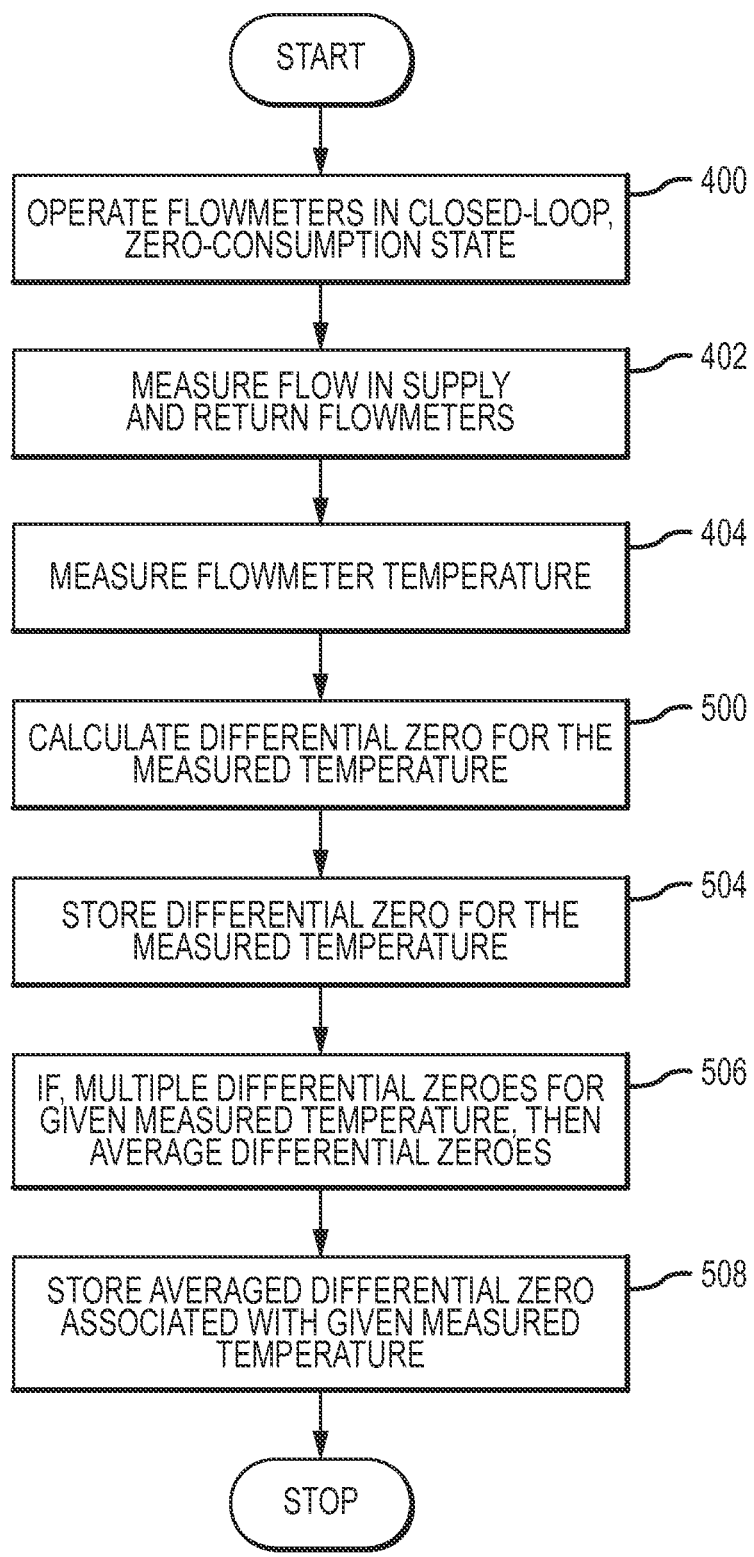
FIG. 5 is a flow chart describing another differential zero routine according to an embodiment of the invention.

FIG. 5. is also a flow chart illustrating an embodiment of a routine performed, such as a zero consumption capture routine 313 and/or differential zero routine 314. Like in other embodiments described, the system 200 is, at some point, run in a closed-loop zero-consumption state in step 400. In such a state, the supply-side flowmeter 214 and return-side flowmeter 216 each experience fluid flow, but the engine 208 or other fuel consumption device is not operating. Therefore, no fuel is being consumed, and the measured flow between the flowmeters 214, 216 should be the same. Flow through the flowmeters 214, 216 is then measured in step 402, and the temperature of at least one of the flowmeters 214, 216 is also measured in step 404. Using the same or similar equations as described above, the differential zero value is calculated based on the temperature measured in step 500. The differential zero value is stored in meter electronics 20 in step 504, and is associated with the measured temperature in step 508. If multiple differential zeroes are measured for a given temperature, then the multiple values are averaged to generate an average differential zero in step 506. The averaged differential zero is then stored in meter electronics 20, being associated with the given temperature in step 508.

Figure 6:
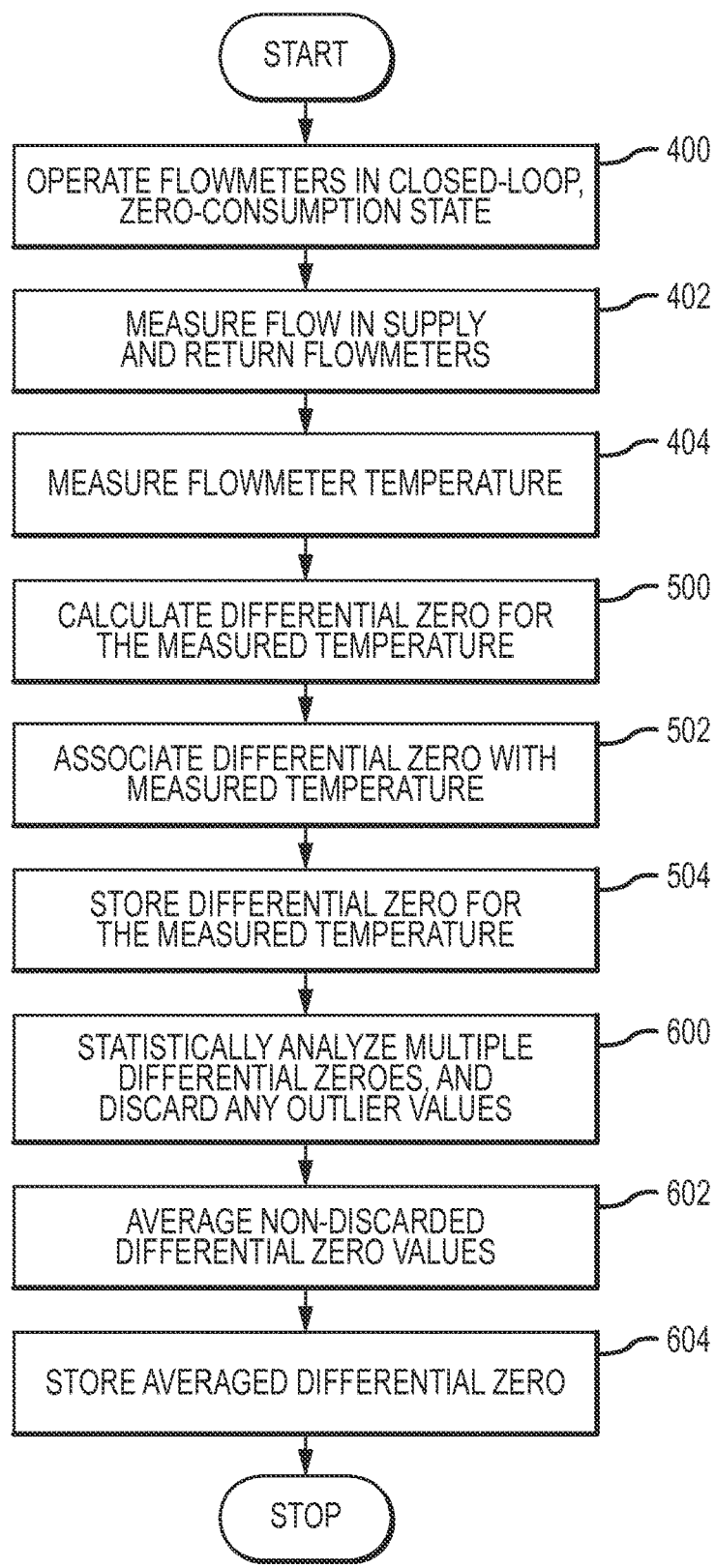
FIG. 6 is a flow chart describing yet another differential zero routine according to an embodiment of the invention.

FIG. 6. is a flow chart illustrating a related embodiment of a routine. Like in other embodiments described, the system 200 is, at some point, run in a closed-loop zero-consumption state in step 400. In such a state, the supply-side flowmeter 214 and return-side flowmeter 216 each experience fluid flow, but the engine 208 or other fuel consumption device is not operating. Therefore, no fuel is being consumed, and the measured flow between the flowmeters 214, 216 should be the same. Flow through the flowmeters 214, 216 is then measured in step 402, and the temperature of at least one of the flowmeters 214, 216 is also measured in step 404. Using the same or similar equations as described above, the differential zero value is calculated based on the temperature measured in step 500. The differential zero value is stored in meter electronics 20, and is associated with the measured temperature in step 502. If multiple differential zeroes for a given measured temperature are stored, the statistical analysis known in the art is applied to the multiple differential zeroes in order to determine the presence of, and discard, any outlier values in step 600. The outlier values are differential zeroes that differ greatly from the majority of the other differential zeroes measured for a given temperature. These values fall outside of an overall data trend present, and are a source of inaccuracy. Such statistical analyses include, for example, without limitation, mean, median, standard deviation, correlation coefficient, Chauvenet's criterion, Dixon's Q test, Grubb's test for outliers, interquartile analyses, Mahalanobis distance calculations, Modified Thompson Tau test, Pierce's criterion, and any other statistical test known in the art. For the multiple differential zero values that are non-discarded, an average is calculated in step 602. This average is then stored in meter electronics in step 604. Such statistical analyses may also be a part of a zero consumption capture routine 313 and/or differential zero routine 314.

Advantageously, compensating for a differential zero offset between two or more meters not only compensates for operating condition-based zero differences, but also removes any absolute zero offset differences between the meters due to installation effects, for example. Furthermore, the differential zero offset does not necessarily need to be determined when the flow rate through the flowmeter is zero so long as the fluid flowing through the flowmeter of interest and the reference flowmeter has substantially the same fluid flow rate. Therefore, the differential zero offset can be determined whenever the engine is off, for example. This assumes however, that any difference between the measured flow rates is due to a change in the zero offset and not attributable to other factors, such as a change in the flow calibration factor. The routines of FIGS. 4-6 may be performed by the manufacturer or by a user after the sensor has been installed. Also, the routines of FIGS. 4-6 may be implemented when the flow rate through the two or more flowmeters 214, 216 is substantially the same, including a fluid flow rate of zero.

The routines exemplified by FIGS. 4-6 can be performed when the fluid consuming device, such as an engine, is off. In other embodiments, the routines can be performed when the flow rates measured by the flowmeters 214, 216 are expected to comprise the same measurement, such as during closed loop operation. Therefore, it should be appreciated that the flow through the flowmeters 214, 216 does not necessarily comprise zero flow and in many embodiments will not comprise zero flow during the routines exemplified by FIGS. 4-6.

According to an embodiment of the invention, the differential zero consumption capture routine 313 may be performed after an initial calibration of the vibrating flowmeter or may comprise part of the initial calibration of the vibrating flowmeter. The zero consumption capture routine 313 may be used to generate a correlation between a zero offset of a vibrating flowmeter and one or more operating conditions of the vibrating flowmeter. The zero offset may comprise an absolute zero offset or a differential zero offset as described above.

Once a differential zero offset is associated with a particular temperature, a measured operating temperature can be compared to a temperature associated with that zero offset stored in meter electronics 20 in order to determine and apply the appropriate zero offset to flow determination equations. According to an embodiment of the invention, the corrected differential zero offset can provide a more accurate determination of the various flow characteristics so that meter electronics 20 can output corrected flow measurements/characteristics. In one embodiment, the corrected differential zero offset can provide a more accurate determination of engine fuel consumption.

Figure 7:
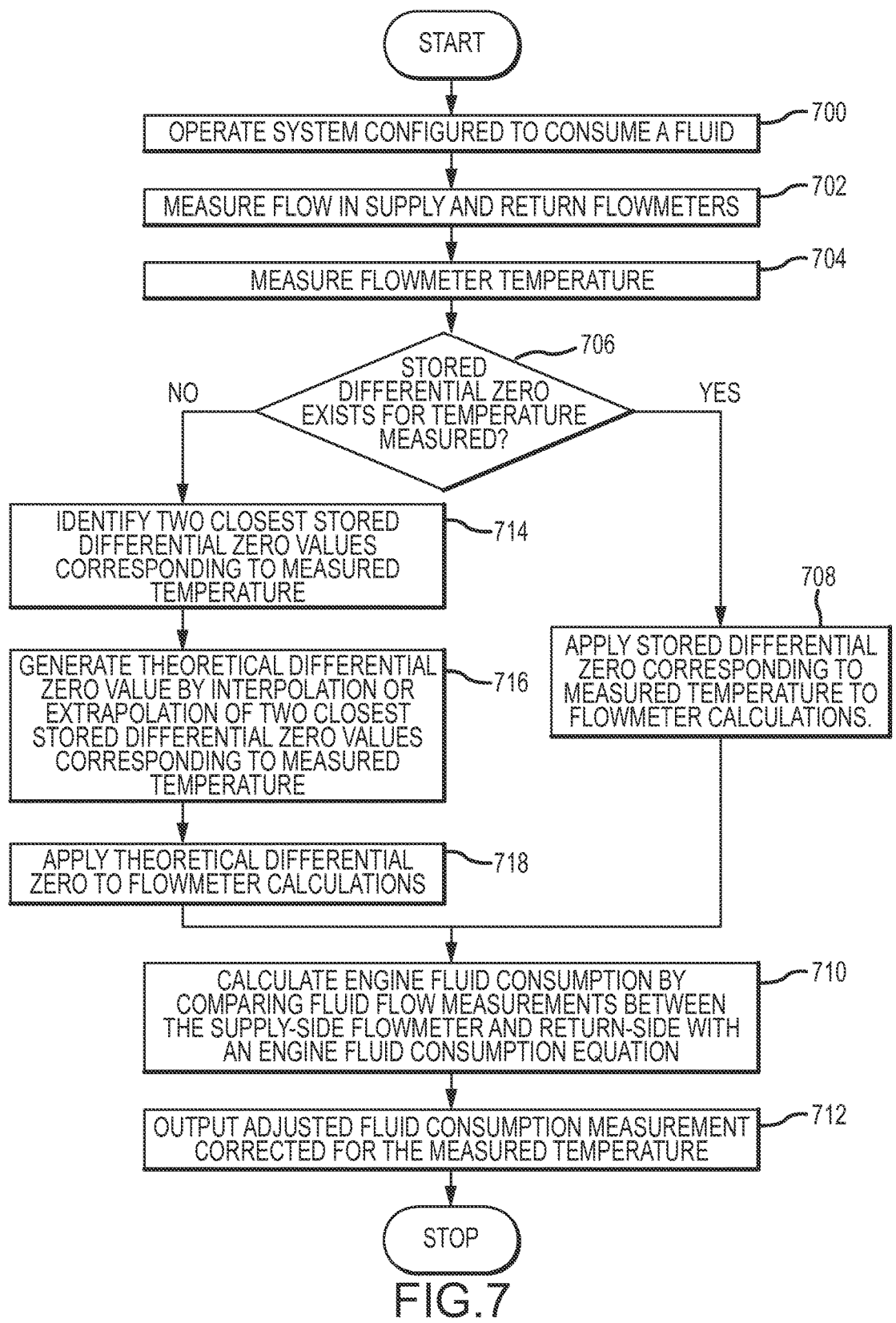
FIG. 7 is a flow chart describing an operating routine according to an embodiment of the invention.

According to an embodiment of the invention, a zero offset determined by the routines exemplified by FIGS. 4-6 may be used during normal operations to determine a differential zero, as indicated by the routine exemplified in FIG. 7. More particularly, the zero offset may be used to determine a differential zero offset based on the measured operating temperature between a supply-side flowmeter 214 and at least a second flowmeter, such as a return-side flowmeter 216.

In yet another embodiment, as illustrated by FIG. 7, the system 200 is operated such that fluid is consumed in step 700, and may comprise an embodiment of a general operating routine 315. In one embodiment, an engine 208 is disposed between at least two flowmeters 214, 216, and the fluid being consumed is fuel for the engine 208. The flow of fluid through the two flowmeters 214, 216 is measured in step 702, as is the temperature of at least one of the flowmeters in step 704. The meter electronics 20 determines if any stored differential zero values exist that correspond to the temperature measured in step 706, as measured by at least one of the flowmeters 214, 216. If a stored differential zero value is associated with the temperature of at least one of the flowmeters 214, 216, then this differential zero value is applied to flowmeter calculations in step 708. The rate of engine fuel consumption is then calculated by comparing the fluid flow measurements between the supply-side flowmeter 214 and return-side flowmeter 216 using any known fluid consumption equation in step 710. The adjusted engine fuel consumption—corrected for by applying the appropriate stored differential zero value—is then output in step 712. However, if no stored differential zero values exist that correspond to the temperature 706, as measured by at least one of the flowmeters 214, 216, then at least the two closest stored differential values are identified in step 714. A theoretical differential zero value is then calculated by an interpolation or extrapolation utilizing at least two of the closest stored differential values that correspond to the measured temperature in step 716. This theoretical differential zero is then applied to flowmeter calculations in step 718. As above, then the rate of engine fuel consumption is calculated by comparing the fluid flow measurements between the supply-side flowmeter 214 and return-side flowmeter 216 using any known fluid consumption equation 710. The adjusted engine fluid consumption—corrected for by applying the appropriate stored differential zero value—is then output 712. It should be appreciated that in many situations the exact measured operating condition may not be stored as a correlated value. For example, if the measured operating condition comprised a temperature of 20° C. and the zero offsets stored had corresponding zero offset values for temperatures of 10° C. and 30° C., the appropriate differential zero offset value could be interpolated from the two available temperatures.

The differential zero routine 314 may be performed to calibrate a differential zero offset between two or more flowmeters. Therefore, the differential zero routine 314 may not necessarily calibrate the flowmeters to read an accurate absolute mass flow rate; but rather, the flowmeters can be calibrated such that the differential reading between the two is accurate. By way of example, if the true flow rate through the supply-side flowmeter 214, as determined by a prover or similar device, is 2000 kg/hour and the flow rate of the fluid passing through the return-side flowmeter 216 comprises 1000 kg/hour, then it is desirable to have the difference between the return-side flowmeter 216 and the supply-side flowmeter 214 equal 1000 kg/hour. However, in many embodiments it may be acceptable if the supply-side flowmeter 214 measures a flow rate of 2020 kg/hour so long as the return-side flowmeter 216 is calibrated to read 1020 kg/hour. Therefore, while the absolute flow rate through each meter may not be accurate, the differential reading is accurate or at least within an acceptable error range. It should be appreciated that the above mentioned values are merely examples and should in no way limit the scope of the present invention.

Advantageously, a differential zero offset may be generated using the stored offset associations and the measured operating conditions. The differential zero offset can be determined without having to re-zero the vibrating flowmeter. The differential zero offset can be determined without having to stop the fluid flow. Rather, the differential zero offset can be determined simply by comparing the measured operating temperature to the stored differential zero offset association.

In some embodiments, a fuel type signal 316 is provided to meter electronics 20. Each fuel type may have separate associated differential zero offsets and associated temperatures stored in meter electronics.

In some embodiments, the determined operating temperature may be the same or within a threshold difference of the operating conditions that were present during the calibration. Therefore, in some embodiments, the measured operating temperature may be compared to initial calibration operating conditions and associated zero offset. If the difference is less than the threshold difference, then a differential zero routine may not attempt to retrieve a differential zero offset, but rather may use an initially calibrated zero offset.

It can easily be appreciated that as more differential zero values are determined at various time points and at various operating temperatures, fluid consumption measurements become more accurate.

It can also be appreciated that multiple zero offsets may be stored for multiple temperatures, respectively, for single-flowmeter applications. Since flowmeters are often required to operate within a range of temperatures, the zero of a meter may drift as operating temperature changes. Different zero offsets can therefore be calculated and saved for different temperatures, and stored in meter electronics 20. For example, if a meter has a zero offset initially captured at 30° C., and then is operated at 60° C., the meter may report flow rates that are less accurate than desired. However, if meter electronics 20 applied a zero offset that was either captured or pre-set for the 60° C. temperature point, the accuracy of the flowmeter would increase. In such a case, one or more sensor signals can be received from the flowmeters 214, 216. Using the same or similar equations as described above, a zero offset value for the single meter may be determined and stored in meter electronics 20. The zero offset value is related to a corresponding temperature that may also be stored in meter electronics 20.

According to an embodiment of the invention, the zero offset may comprise an initially determined zero offset. This may be the case if a routine, for example, is implemented as part of an initial calibration of the flowmeter. According to another embodiment of the invention, the zero offset may comprise a subsequently determined zero offset. The subsequently determined zero offset may be different than the initially determined zero offset. This may be the case especially in situations where the operating conditions are different from the operating conditions when the initial zero offset was determined, for example. Subsequently determined zero offsets may be recorded by users as the need arises due to changing operating conditions.

Figure 8:
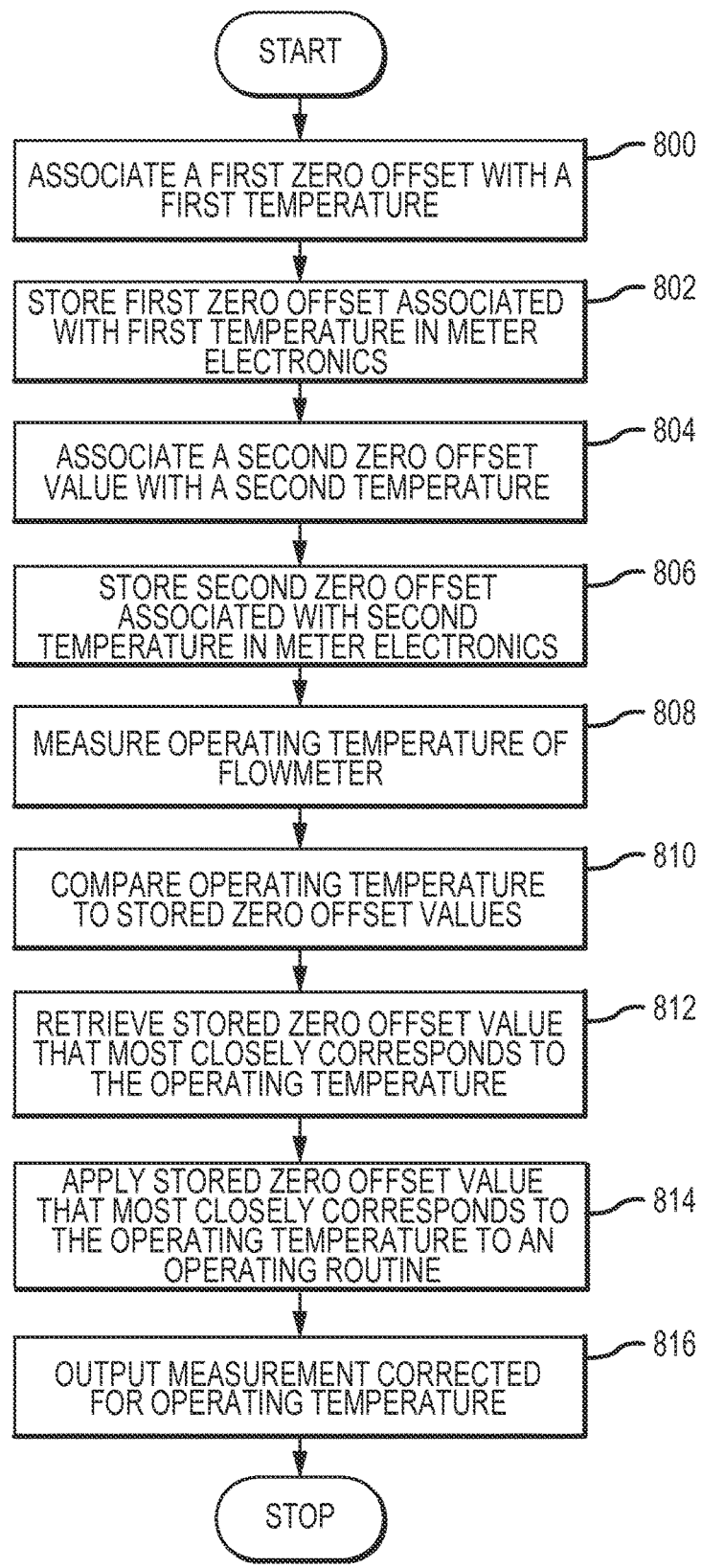
FIG. 8 is a flow chart describing flowmeter operation according to an embodiment of the invention.

One example of a method for operating a flowmeter contemplated as an embodiment is illustrated in FIG. 8. In step 800, a first zero offset value is associated with a first temperature sensor signal value. In step 802, the first zero offset value is associated with the first temperature sensor signal value and stored in meter electronics 20. A variety of formats including, for example, look-up tables, graphs, equations, etc., may be stored in meter electronics 20, local hardware, software, or remote hardware/computing devices (not shown). A second zero offset value is associated with a second temperature sensor signal value in step 804, and is stored in meter electronics 20 in step 806. In step 808, an operating temperature of the flowmeter is measured. The temperature may be determined by processing the sensor signals. Alternatively, the temperature may be determined from external inputs such as an external temperature sensor (not shown). The temperature may be determined using an RTD, for example. The temperature may correspond to a flowmeter temperature or a meter electronics temperature, for example. The operating temperature is compared to at least the first zero offset value and the second zero offset value in step 810. Although only two temperature-related zero offsets are noted for sake of simplicity, many zero offsets at many temperatures are contemplated. Additionally, multiple zero offsets may be calculated for a particular temperature, and statistical analyses may be applied to these multiple measurements to reflect a more accurate zero offset for a particular temperature. An example, without limitation, would be a simple mean calculation. In step 812, the stored zero offset value that most closely corresponds to the operating temperature is retrieved. The retrieved stored zero offset value that most closely corresponds to the operating temperature is applied to an operating routine in step 814, and an adjusted flowmeter measurement that is corrected for the operating temperature is outputted in step 816.

The present invention as described above provides various methods to determine and compensate for changes that may occur in the differential zero offset of a vibrating flowmeter, such as a Coriolis flowmeter. Although the various embodiments described above are directed towards flowmeters, specifically Coriolis flowmeters, it should be appreciated that the present invention should not be limited to Coriolis flowmeters, but rather the methods described herein may be utilized with other types of flowmeters, or other vibrating sensors that lack some of the measurement capabilities of Coriolis flowmeters.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other vibrating sensors, and not just to the embodiments described above and shown in the accompanying figures. Accordingly, the scope of the invention should be determined from the following claims.

We claim:

1. A method for operating a system configured to consume a fluid, having at least two flowmeters, comprising the steps of:
    recirculating a fluid in a closed loop having a supply-side flowmeter and return-side flowmeter, such that substantially no fluid is consumed;
    measuring a fluid flow in the supply-side flowmeter and the return-side flowmeter;
    comparing fluid flow measurements between the supply-side flowmeter and return-side flowmeter;
    determining a first differential zero value based on a difference in the fluid flow measurements between the supply-side flowmeter and return-side flowmeter;
    receiving a first temperature sensor signal value;
    associating the first differential zero value with the first temperature sensor signal value; and
    storing the first differential zero value associated with the first temperature sensor signal value in a meter electronics;
    wherein multiple differential zero values are determined for the first temperature sensor signal value, each at different time points, and are stored and associated with the first temperature sensor signal value.

2. The method for operating the system configured to consume a fluid of claim 1, comprising the steps of:
    averaging the multiple differential zero values to calculate an averaged multiple differential zero value;
    associating the averaged multiple differential zero value with the first temperature sensor signal value;
    storing the averaged multiple differential zero value associated with the first temperature sensor signal value in the meter electronics.

3. The method for operating the system configured to consume a fluid of claim 2, comprising the steps of:
    applying a statistical analysis to the multiple differential zero values; and
    discarding outlier differential zero values.

4. The method for operating the system configured to consume a fluid of claim 1, comprising the steps of:
    measuring a second fluid flow in the supply-side flowmeter and the return-side flowmeter;
    comparing the second fluid flow measurements between the supply-side flowmeter and return-side flowmeter, and determining a second differential zero value based on the difference in the fluid flow measurements between the supply-side flowmeter and return-side flowmeter;

receiving a second temperature sensor signal value from at least one of the supply-side flowmeter and the return-side flowmeter;

associating the second differential zero value with the second temperature sensor signal; and storing the second differential zero value associated with the second temperature sensor signal value in the meter electronics.

5. A method for operating a multi-fuel system, having an engine, at least two fuel tanks configured to each contain different fuels, and at least a supply-side flowmeter and a return-side flowmeter, comprising the steps of:

recirculating a first fuel type in a closed loop while the engine is not operating, such that substantially no fuel is consumed;

measuring a first fuel flow in the supply-side flowmeter and the return-side flowmeter;

comparing the first fuel flow measurements between the supply-side flowmeter and return-side flowmeter, and determining a first differential zero value based on the difference in the fuel flow measurements between the supply-side flowmeter and return-side flowmeter;

receiving a first temperature sensor signal value;

associating the first differential zero value with the first temperature sensor signal value and the first fuel type;

storing the first differential zero value associated with the first temperature sensor signal value and the first fuel type in a meter electronics;

recirculating a second fuel type in the closed loop while the engine is not operating, such that substantially no fuel is consumed;

measuring a second fuel flow in the supply-side flowmeter and the return-side flowmeter;

comparing the second fuel flow measurements between the supply-side flowmeter and return-side flowmeter, and determining a second differential zero value based on the difference in the fuel flow measurements between the supply-side flowmeter and return-side flowmeter;

receiving a second temperature sensor signal value;

associating the second differential zero value with the second temperature sensor signal value and second fuel type; and storing the second differential zero value associated with the second temperature sensor signal value and the second fuel type in the meter electronics;

wherein multiple differential zero values are determined for the first temperature sensor signal value, each at different time points, and are stored and associated with the first temperature sensor signal value.

\* \* \* \* \*